United States Patent
Mekkattuparamban et al.

(10) Patent No.: US 8,064,362 B2
(45) Date of Patent: Nov. 22, 2011

(54) WIDE AREA NETWORK OPTIMIZATION PROXY ROUTING PROTOCOL

(75) Inventors: Joji Thomas Mekkattuparamban, Sunnyvale, CA (US); Ming Chen, Fremont, CA (US); Akshya Kumar Singh, Santa Clara, CA (US); Jesper Skriver, Nicosia (CY); Vivek Datar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 12/195,875

(22) Filed: Aug. 21, 2008

(65) Prior Publication Data

US 2010/0046523 A1   Feb. 25, 2010

(51) Int. Cl.
*H04L 12/28* (2006.01)
*H04L 12/56* (2006.01)

(52) U.S. Cl. .................. 370/254; 370/401; 370/463
(58) Field of Classification Search .......... None
See application file for complete search history.

(56) References Cited

U.S. PATENT DOCUMENTS

| | | | | |
|---|---|---|---|---|
| 5,856,974 A * | 1/1999 | Gervais et al. | ............. | 370/392 |
| 6,456,599 B1 * | 9/2002 | Elliott | ............. | 370/254 |
| 6,526,056 B1 * | 2/2003 | Rekhter et al. | ............. | 370/392 |
| 6,577,644 B1 * | 6/2003 | Chuah et al. | ............. | 370/466 |
| 6,680,942 B2 * | 1/2004 | Mead et al. | ............. | 370/392 |
| 7,123,587 B1 * | 10/2006 | Hass et al. | ............. | 370/238 |
| 7,389,533 B2 * | 6/2008 | Bartlett et al. | ............. | 726/15 |
| 7,447,901 B1 * | 11/2008 | Sullenberger et al. | ......... | 713/153 |
| 7,453,876 B2 * | 11/2008 | Hua et al. | ............. | 370/392 |
| 7,457,287 B1 * | 11/2008 | Shaffer et al. | ............. | 370/389 |
| 7,564,802 B2 * | 7/2009 | Andrapalliyal et al. | ...... | 370/254 |
| 7,581,022 B1 * | 8/2009 | Griffin et al. | ............. | 709/238 |
| 7,610,386 B1 * | 10/2009 | Martinez et al. | ............. | 709/227 |
| 7,630,392 B2 * | 12/2009 | Raza | ............. | 370/432 |
| 7,633,942 B2 * | 12/2009 | Bearden et al. | ............. | 370/392 |
| 7,668,167 B2 * | 2/2010 | Jacquet et al. | ............. | 370/392 |
| 7,701,876 B2 * | 4/2010 | Shin et al. | ............. | 370/254 |
| 7,710,865 B2 * | 5/2010 | Naseh et al. | ............. | 370/221 |
| 7,801,057 B2 * | 9/2010 | Wool | ............. | 370/254 |
| 7,920,572 B2 * | 4/2011 | Bates et al. | ............. | 370/395.2 |
| 7,953,103 B2 * | 5/2011 | Raza | ............. | 370/432 |
| 2003/0105812 A1 * | 6/2003 | Flowers et al. | ............. | 709/203 |
| 2005/0036509 A1 * | 2/2005 | Acharya et al. | ............. | 370/466 |
| 2005/0235065 A1 * | 10/2005 | Le et al. | ............. | 709/238 |
| 2006/0227723 A1 * | 10/2006 | Vasseur et al. | ............. | 370/254 |
| 2006/0291473 A1 * | 12/2006 | Chase et al. | ............. | 370/395.5 |
| 2007/0201474 A1 * | 8/2007 | Isobe | ............. | 370/392 |
| 2008/0002727 A1 * | 1/2008 | Yamane | ............. | 370/401 |
| 2008/0037537 A1 * | 2/2008 | Yao et al. | ............. | 370/389 |
| 2008/0049622 A1 * | 2/2008 | Previdi et al. | ............. | 370/237 |

(Continued)

*Primary Examiner* — Gregory Sefcheck
(74) *Attorney, Agent, or Firm* — Tucker Ellis & West LLP

(57) ABSTRACT

In an example embodiment disclosed herein, Wide Area Network optimization modules coupled to peers are configured to maintain peer routing tables. The peer routing table (PRT) is used by the Wide Area Network optimization module to determine the peer for a given destination, such as an Internet Protocol "IP" destination. Each peer is responsible for advertising to other peers which networks the peer is able to reach. This information is advertised when a tunnel is first created and subsequently whenever necessary. Initially, a peer sends out a list of entries corresponding to its directly connected networks, with the exception of the network connected to the interface on which the peer is advertising (e.g. the network used for the tunnel). This enables other peers on the network to populate their PRT entries.

16 Claims, 4 Drawing Sheets

U.S. PATENT DOCUMENTS

| | | | |
|---|---|---|---|
| 2008/0062866 A1* | 3/2008 | Jiang et al. | 370/229 |
| 2008/0082648 A1* | 4/2008 | Ahmed et al. | 709/223 |
| 2008/0115177 A1* | 5/2008 | Kim et al. | 725/90 |
| 2008/0151917 A1* | 6/2008 | Bartlett et al. | 370/401 |
| 2008/0288580 A1* | 11/2008 | Wang et al. | 709/203 |
| 2009/0213858 A1* | 8/2009 | Dolganow et al. | 370/395.5 |
| 2009/0248800 A1* | 10/2009 | Chu et al. | 709/204 |

* cited by examiner

300

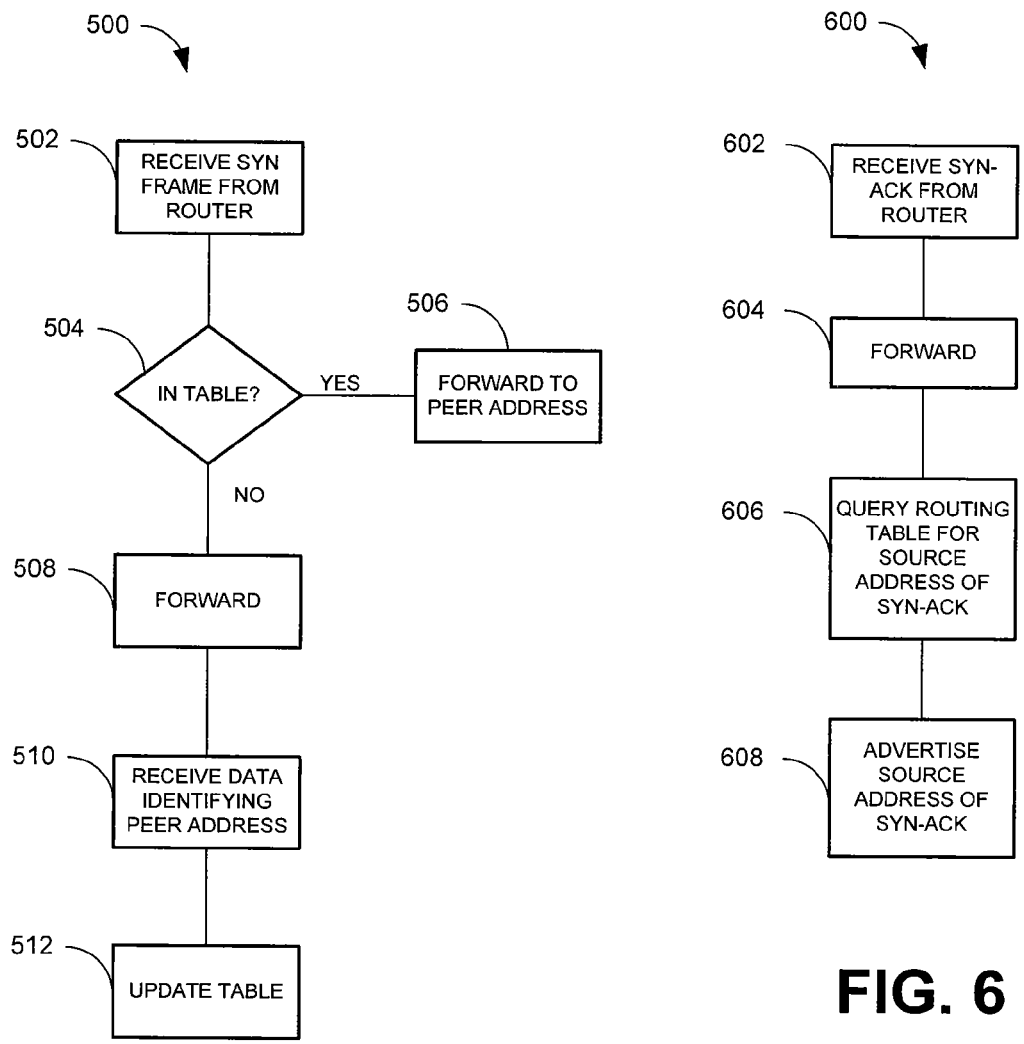

WIDE AREA NETWORK OPTIMIZATION PROXY ROUTING PROTOCOL

TECHNICAL FIELD

The present disclosure relates generally to network communications such as Wide Area Network (WAN) communications.

BACKGROUND

Proxies are often used at Transport layer and above as a performance enhancement mechanism, especially across WAN links. These proxies rely on peer-to-peer relationships in order to perform their function. This results in a proxy peer network overlaying the layer 3 network and having its own peer-routing information base. In order for the proxies to operate transparently without requiring elaborate configuration, the proxies should be able to derive their routing information from the underlying layer 3 (L3) network.

An approach to the problem is to use manual configuration, but that solution is definitely not attractive to an end user. Another approach is to try to derive the routing information from the L3 routing table of the attached router. The L3 routing table, however, does not have a view beyond the next hop and thus cannot automatically derive this information.

BRIEF DESCRIPTION OF THE DRAWINGS

The accompanying drawings incorporated herein and forming a part of the specification illustrate the example embodiments.

FIG. 5 illustrates an example methodology 500 employed by a WAN optimization proxy for processing a packet for initiating the establishment of a session.

FIG. 6 illustrates an example methodology 600 for a WAN optimization proxy to process a packet for responding to a request to establish a session.

OVERVIEW OF EXAMPLE EMBODIMENTS

Figure 2:
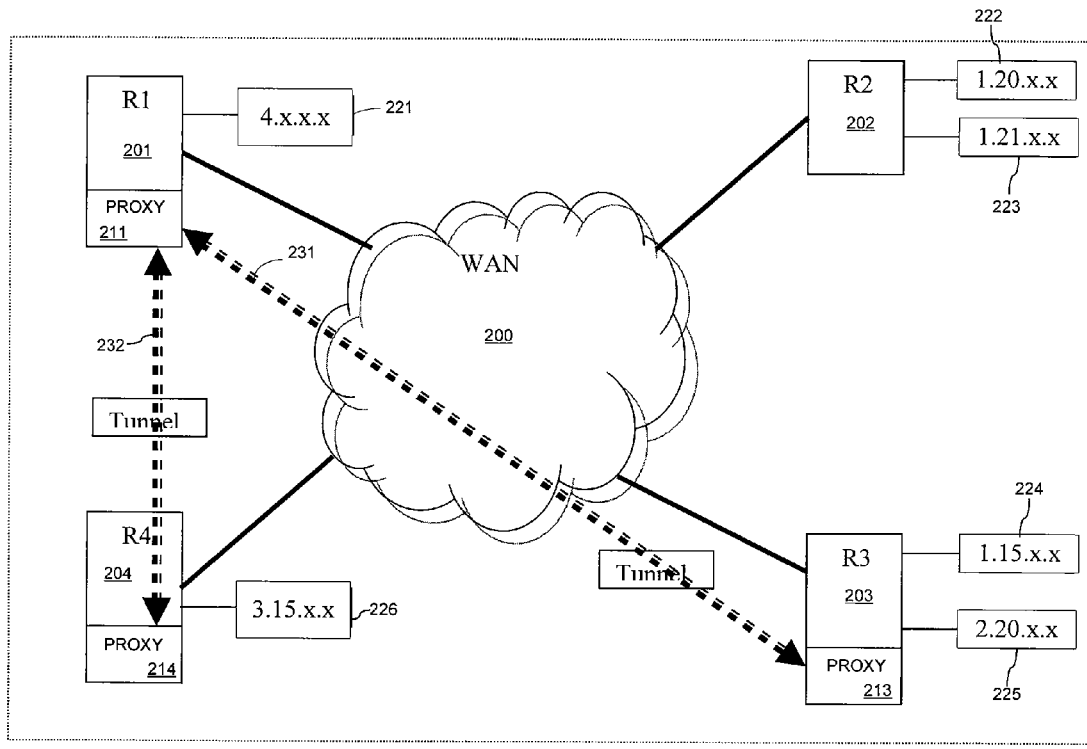
FIG. 2 illustrates an example of a network with attached routers employing a WAN optimization proxy.

The following presents a simplified overview of the example embodiments in order to provide a basic understanding of some aspects of the example embodiments. This overview is not an extensive overview of the example embodiments. It is intended to neither identify key or critical elements of the example embodiments nor to delineate the scope of the appended claims. Its sole purpose is to present some concepts of the example embodiments in a simplified form as a prelude to the more detailed description that is presented later.

In an example embodiment disclosed herein, WAN optimization modules coupled to peers are configured to maintain peer routing tables. The peer routing table (PRT) is used by the WAN optimization module to determine the peer for a given destination, such as an Internet Protocol "IP" destination. Each peer is responsible for advertising to other peers which networks the peer is able to reach. This information is advertised when a tunnel is first created and subsequently whenever necessary. Initially, a peer sends out a list of entries corresponding to its directly connected networks, with the exception of the network connected to the interface on which the peer is advertising (e.g. the network used for the tunnel). This enables other peers on the network to populate their PRT entries.

DESCRIPTION OF EXAMPLE EMBODIMENTS

This description provides examples not intended to limit the scope of the appended claims. The figures generally indicate the features of the examples, in which it is to be understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The description of the example embodiments provided herein employs terminology consistent with Transmission Control Protocol (TCP) and Stream Control Transmission Protocol (SCTP). This is done merely for ease of illustration, as those skilled in the art should readily appreciate that the example embodiments described herein are capable of being adapted for use with any protocol that provides delivery of messages between endpoints on a network, and thus the example embodiments should not be considered as limited to TCP and/or SCTP compatible networks.

In an example embodiment disclosed herein, WAN optimization modules coupled to peers are configured to maintain peer routing tables. The peer routing table (PRT) is used by the WAN optimization module to determine the peer for a given destination, such as an Internet Protocol "IP" destination. Below is an example of a PRT:

| Network | Netmask | Peer Id |
|---------|---------|---------|
| a.b.0.0 | 255.255.0.0 | n |
| c.0.0.0 | 255.0.0.0 | o |

Each peer is responsible for advertising to other peers which networks the peer is able to reach. This information is advertised when a tunnel is first created and subsequently whenever necessary. Initially, a peer sends out a list of entries corresponding to its directly connected networks, with the exception of the network connected to the interface on which the peer is advertising (e.g. the network used for the tunnel). This enables other peers on the network to populate their PRT entries. Networks that are reachable indirectly via another router are not advertised by the peer.

When a peer has to service a TCP (Transmission Control Protocol), the peer WAN optimization module coupled to the peer looks up the destination peer in its PRT. If a match for the destination peer is found, the request is processed using the tunnel to the destination peer. If a matching entry is not found, the request is bypassed as if the service is not available. Initially, a destination that is reachable indirectly via another peer is bypassed in this manner. The destination peer has the inherent capability to snoop these bypassed request/responses. When the destination peer sees the bypassed request/response, it will query its Layer 3 (L3) routing table to determine the matching network prefix and then advertise the corresponding PRT entry. Subsequent requests to that network would be serviced by the WAN optimization module using this newly-added PRT.

Figure 1:
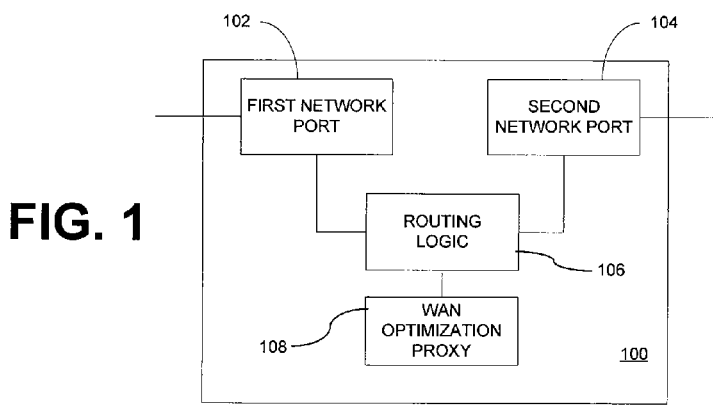
FIG. 1 illustrates an example of a router with a Wide Area Network (WAN) optimization proxy.

FIG. 1 illustrates an example of a router 100 with a WAN optimization proxy 108. Router 100 comprises a first network port 102 that provides an interface to a first network, a second network port 104 that provides an interface to a second network, and routing logic 106 for routing packets between first network port 102 and second network port 104. "Logic," as used herein, includes but is not limited to hardware, firmware, software, and/or combinations of each to perform a function (s) or an action(s) and/or to cause a function or action from another component. For example, based on a desired application or need, logic may include a software-controlled microprocessor, discrete logic such as an application specific integrated circuit (ASIC), a programmable/programmed logic device, memory device containing instructions, or the like, or combinational logic embodied in hardware. Logic may also be fully embodied as software. WAN optimization proxy 108, comprises a module that comprises logic for performing the WAN optimization proxy features described herein, is coupled to routing logic 106. Although WAN optimization proxy 108 is illustrated as being contained within router 100, those skilled in the art should readily appreciate that it is also possible for WAN optimization proxy 108 to be contained in another device (not shown) that is in communication with routing logic 106. In an example embodiment, WAN optimization proxy 108 comprises memory for maintaining data correlating networks to peer identifiers, such as the PRT table illustrated herein supra. Moreover, although router 100 is illustrated as having two network ports 102, 104, this is merely for ease of illustration, as those skilled in the art should readily appreciate that router 100 may suitably comprise any physically realizable number of ports, which may be coupled to any physically realizable number of networks.

In operation, routing packet logic 106 determines whether a packet that is received on either first network port 102 or second network port 104 is either a request to establish a session (such as a TCP Synchronize "SYN" packet) or is a response to a request to establish a session (such as a TCP Acknowledgment and Synchronize-"SYN-ACK" packet). When routing logic 106 encounters a SYN or SYN-ACK packet, the packet is forwarded to WAN optimization Proxy 108.

In an example embodiment, if a packet received on first interface 102 that is forwarded by routing logic 106 to WAN optimization proxy 108 is a request to establish a session, for example a TCP SYN packet, the WAN optimization proxy 108 is configured to search its memory, which for example may suitably comprise a PRT described herein supra, for a peer identifier associated with a network responsive to receiving a packet for establishing a connection with a destination device on the first interface 102. If a matching peer is found in the table, the request is processed using the tunnel to that peer. In an example embodiment, the tunnel is a Session Control Transport Protocol (SCTP) tunnel. If a matching request is not found, WAN optimization proxy 108 is configured to forward the packet onto second interface 104. Second interface 104 may be coupled to a wide area network (WAN).

In an example embodiment, WAN optimization proxy 108 receives a message, such as an advertisement message, identifying a peer associated with the destination device for the request to establish a session. WAN optimization logic 108 is configured to store data in the memory, identifying the peer associated with the destination device, responsive to receiving the advertisement message on second interface 104, identifying the peer for the network associated with the destination device. In an example embodiment, the advertisement message is a multicast message. In particular embodiments, WAN optimization proxy 108 may have the message forwarded to first network port 102 (or all other ports except for the port receiving the message) for transmission.

After WAN optimization proxy 108 has stored the identifier for the peer to the destination network, any subsequent packet that is received for establishing a connection (for example, a TCP SYN) with a device associated on the network associated with the destination device is routed to the peer.

In an example embodiment, if a packet received on first interface 102 that is forwarded by routing logic 106 to WAN optimization proxy 108 is a response to a request to establish a session, for example a TCP SYN-ACK packet, the WAN optimization proxy 108 is configured to route the packet as is; for example, the packet is forwarded onto second network port (or the appropriate port) 104. WAN optimization logic 108 is further configured to query a routing table for an entry that matches a source address of the response (SYN-ACK) packet. Cache logic 108 is configured to advertise a matching routing table entry corresponding to the source address of the response packet on second interface 104.

In an example embodiment, the routing table is a peer routing table as described herein. In particular embodiments, the routing table entry further comprises data identifying a tunnel to the peer. The tunnel may be a Session Control Transport Protocol (SCTP) tunnel. Second network port 104 may be coupled to a wide area network (WAN). In an example embodiment, WAN optimization logic 108 is further configured to advertise the routing table entry by sending a multicast packet onto the second network via second network port 104.

FIG. 2 illustrates an example of a network 200 with attached routers employing a WAN optimization proxy. Network 200 is merely being used to demonstrate the various example embodiments of the WAN optimization proxies, such as WAN optimization proxy 108 described in FIG. 1, and therefore should not be construed to limiting the example embodiments described herein to like networks. In the example illustrated in FIG. 2, Routers 201, 203, and 204 have coupled WAN optimization proxies as illustrated by 211, 213, and 214, respectively. When a tunnel is first created and subsequently whenever necessary and/or desired, WAN optimization proxies 211, 213, and 214 advertise networks coupled to them. For example, WAN optimization proxy 213 would advertise networks 224 and 225.

Note that router 202 does not have a WAN optimization proxy. This illustrates that the example embodiments illustrated herein are capable of communicating with routers that do not provide WAN optimization proxy services as described herein.

Router 201 is coupled to network 200 and network 221, which has an IP address of 4.x.x.x. Router 202 is coupled to network 200 and to two additional networks 222 and 223. Network 222 has an IP address of 1.20.x.x, and network 223 has an IP address of 1.21.x.x. Router 203 is coupled to network 200 and to networks 224 and 225. Network 224 has an IP address of 1.15.x.x, and network 225 has an IP address of 2.20.x.x. Router 204 is coupled to network 200 and network 226, which has an IP address of 3.15.x.x.

Tunnel 231 is established between WAN optimization proxy 211 coupled to router 201 and WAN optimization proxy 213 coupled to router 203. Tunnel 232 is established between WAN optimization proxy 211 coupled to router 201 and WAN optimization proxy 214 coupled to router 204.

For example, a device on network 221 may initiate a TCP session with a device on network 225. A SYN packet is sent that is received by router 201. The packet is then forwarded to WAN optimization proxy 211. If WAN optimization proxy 211 does not have an entry for network 225, the packet is forwarded onto network 200.

The destination device on network 225 will send a SYN-ACK. Router 203 intercepts the SYN-ACK and forwards the SYN-ACK to WAN optimization proxy 213. WAN optimization proxy 213 forwards the packet onto network 200. WAN optimization proxy 213 queries the IP routing table of the companion Router 203 to search for the source address of the SYN-ACK packet. If WAN optimization proxy 213 finds a match for the source address of the SYN-ACK packet, the matching entry is advertised on network 200. The advertisement may be a multicast packet. When WAN optimization proxy 211 receives the advertisement sent by WAN optimization proxy 213, WAN optimization proxy 211 will update its PRT table such that subsequent SYN packets received by WAN optimization proxy 211 for network 225 will be routed to WAN optimization proxy 213. Similarly, WAN optimization proxy 214 and any other WAN optimization proxies in the network would update their PRT table as well. Additionally, all WAN optimization proxies that receive the advertisement will query their companion router's IP routing table to determine if there exists a route corresponding to a subnet (i.e. a route with a longer prefix) of the received PRT entry. If such a route is found, that route is advertised so as to ensure the best route is used. If a tunnel has been established, e.g. tunnel 231, subsequent SYN packets will be routed through the tunnel.

Tunnel 232 can be employed to route packets between router 201/WAN optimization proxy 211 and router 204/WAN optimization proxy 214. For example, SYN and/or SYN-ACK packets between network 221 and network 226 can be forwarded through tunnel 232.

Figure 3:
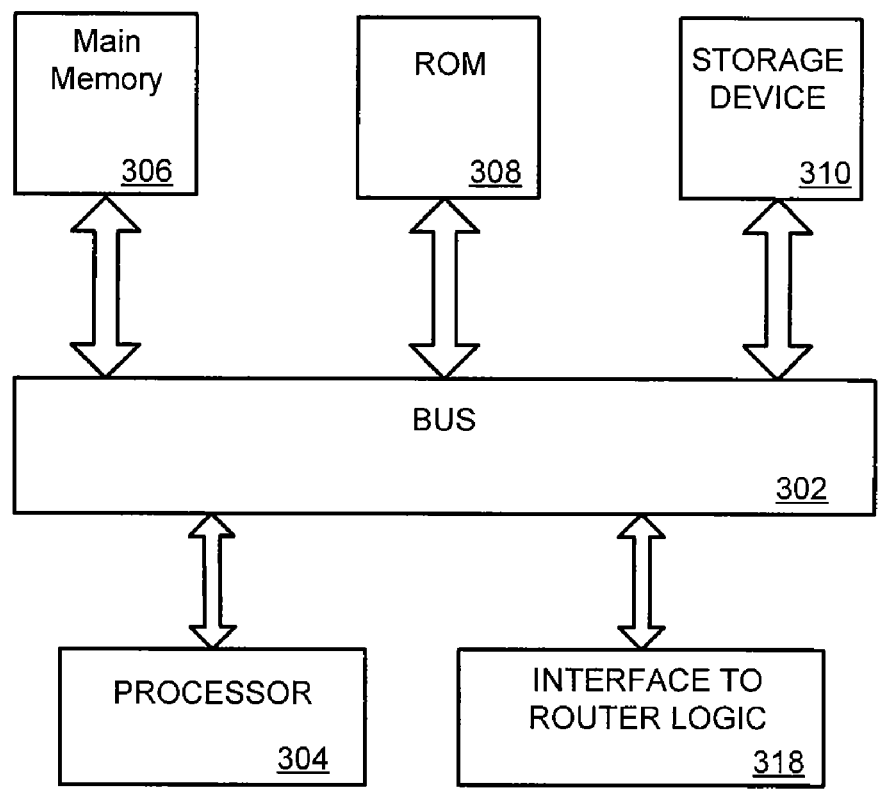
FIG. 3 illustrates an example of a computer system upon which an example embodiment may be implemented.

FIG. 3 illustrates an example of a computer system 300 upon which an example embodiment may be implemented. Computer system 300 is suitable for implementing WAN optimization proxy 108 (FIG. 1) and/or WAN optimization proxies 211, 213, 214 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device, coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for a WAN optimization proxy. According to an example embodiment, a WAN optimization proxy is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 304 for execution. Such a medium may take many forms, including but not limited to non-volatile media, volatile media, and transmission media. Non-volatile media include, for example, optical or magnetic disks such as storage device 310. Volatile media include dynamic memory such as main memory 306. Transmission media include coaxial cables, copper wire, and fiber optics, including the wires that comprise bus 302. Transmission media can also take the form of acoustic or light waves such as those generated during radio frequency (RF) and infrared (IR) data communications. Common forms of computer-readable media include, for example, floppy disk, flexible disk, hard disk, magnetic cards, paper tape, any other physical medium with patterns of holes, RAM, PROM, EPROM, FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 optionally may be stored on storage device 310 either before or after execution by processor 304.

Computer system 300 also includes an interface 318 to router logic coupled to bus 302. Interface 318 provides a two-way data communication coupling computer system 300 to the router logic and enables a router to forward intercepted packets to computer system 300 and allows computer system 300 to forward packets onto a network through the router.

Figure 4:
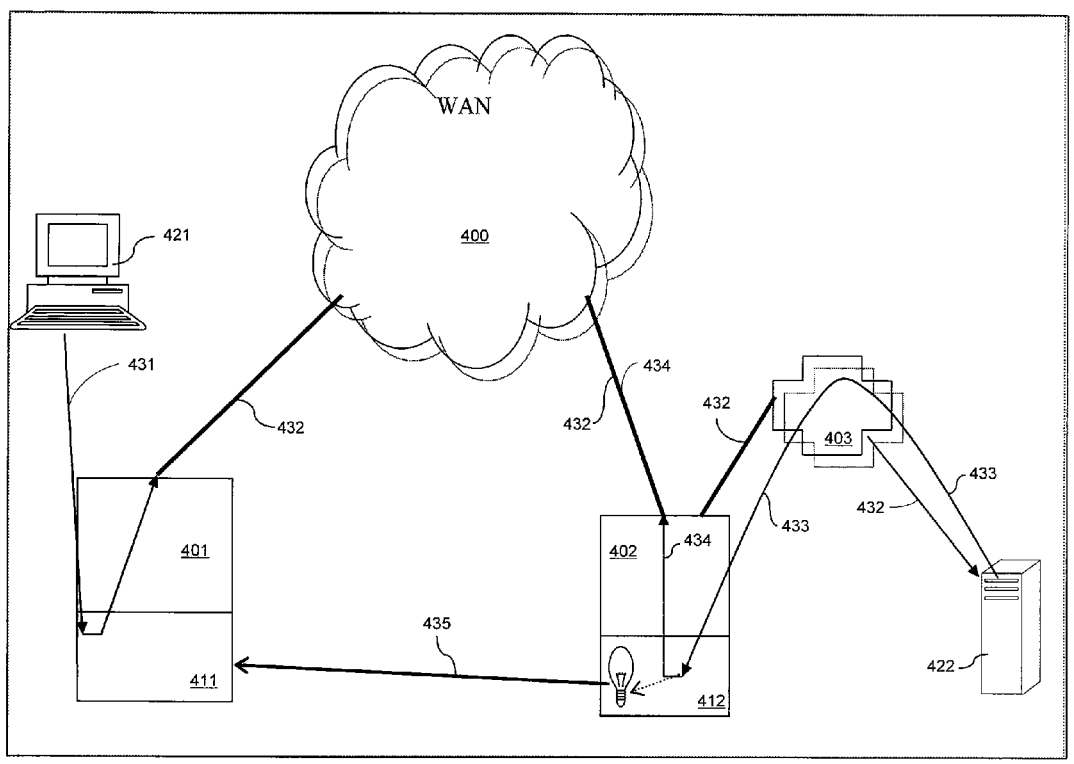
FIG. 4 illustrates an example signal flow between two routers with WAN optimization proxies coupled to a network.

FIG. 4 illustrates an example signal flow between two routers 401, 402 with WAN optimization proxies 411, 412 coupled to a network 400. Client 421 initiates a connection to a server (422 in this example) by sending a SYN packet illustrated by signal 431. SYN packet 431 is intercepted by router 401 and sent to WAN optimization module 411. WAN optimization module 411, responsive to not finding a match for server 422, forwards the packet onto network 400 as illustrated by signal 432. Because WAN optimization module 411 does not have an entry for server 422, no proxy service is provided, and the packet is sent on network 400 like any other SYN packet. The SYN packet is forwarded from network 400 through router 402 onto network 403, from which it is received by server 422.

Server 422 responds by sending a SYN-ACK as illustrated by 433. The SYN-ACK is intercepted by router 402 and forwarded to WAN optimization logic 412. WAN optimization logic 412 forwards the intercepted packet onto network 400, as illustrated by signal 434. WAN optimization logic 412 also searches its Layer 3 routing table of router 402 for an entry that matches the source address of the SYN-ACK. If WAN optimization proxy 412 finds a matching entry, WAN optimization proxy 412 advertises the entry, which is received by WAN optimization proxy 411 as illustrated by signal 435 (it should be noted that signal 435 is illustrated as a direct path between WAN optimization proxy 412 to WAN optimization proxy 411; this is merely to illustrate the entry being advertised by WAN optimization proxy 412 and received by WAN optimization proxy 411, as the packet would actually be routed onto network 400—in an example embodiment, WAN optimization proxy 412 would send a multicast packet on network 400 to advertise the entry).

WAN optimization proxy 411, responsive to receiving message 435 from WAN optimization proxy 412 advertising router 402 as the peer for server 422, would store the data as an entry in its PRT. Subsequent SYN packets received by WAN optimization proxy 411 are then serviced by WAN optimization proxy 411.

The example embodiment just described is truly transparent to the both the client and server. The server receives the original SYN packet, which is never altered or modified. Similarly, the SYN-ACK received by the client is not modified. The example embodiment just described allows a PRT to be built progressively, based on the transactions that take place within a given network. Thus, the PRT only grows to the size it needs to be for the given network.

In view of the foregoing structural and functional features described above, methodologies in accordance with example embodiments will be better appreciated with reference to FIGS. 5 and 6. While, for purposes of simplicity of explanation, the methodologies of FIGS. 5 and 6 are shown and described as executing serially, it is to be understood and appreciated that the example embodiment is not limited by the illustrated order, as some aspects could occur in different orders and/or concurrently with other aspects from those shown and described herein. Moreover, not all illustrated features may be required to implement the methodologies described herein. The methodologies described herein are suitably adapted to be implemented in hardware, software, or a combination thereof.

FIG. 5 illustrates an example methodology 500 employed by a WAN optimization proxy for processing a packet for initiating the establishment of a session. At 502, a frame for establishing a connection (for example, a TCP SYN frame) is intercepted by a router coupled to the WAN optimization proxy.

At 504, the WAN optimization proxy determines whether there is an entry in a packet routing table (PRT) identifying a peer for the IP destination. If a peer has been found (YES), at 506 the packet is forwarded to the peer (e.g., tunnel) for the destination address. If at 504 a peer is not found (NO), at 508 the packet is forwarded as if no proxy service existed.

At 510, the WAN optimization proxy receives data identifying a peer for the destination address. At 512, the WAN optimization proxy updates the PRT table with the peer identifier for the destination address. If a subsequent packet is received for establishing another session to the same destination network, the entry is found at 504, and the WAN optimization proxy forwards the packet to the peer address stored in the PRT table.

FIG. 6 illustrates an example methodology 600 for a WAN optimization proxy to process a packet for responding to a request to establish a session. In the illustrated embodiment, the WAN optimization proxy advertises that it is servicing the destination network responsive to a session and/or tunnel being established.

At 602, a response packet for establishing a connection (for example, a TCP SYN-ACK packet) is intercepted by a router (for example, on a first network port) coupled to the WAN optimization proxy. At 604, the WAN optimization proxy forwards the packet onto the network port (for example, a second network port) on which the destination packet was being forwarded.

At 606, the WAN optimization proxy searches its packet routing table (PRT), for example a layer 3 routing table, for the source address of the SYN-ACK packet. If the source address of the SYN-ACK packet belongs to a network that is coupled to the router, at 608 the WAN optimization proxy advertises the matching PRT entry on the second network port. In an example embodiment, the WAN optimization proxy sends a broadcast/multicast message on the second network advertising the entry. The advertisement message enables the destination router of the SYN-ACK packet and, in at least one example embodiment, any router coupled to the same network to update its PRT table to associate the peer identifier of the WAN optimization proxy with the source network of the SYN-ACK packet.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims, interpreted in accordance with the breadth to which they are fairly, legally, and equitably entitled.

The invention claimed is:

1. An apparatus, comprising:
a first interface coupled with a first associated network;
a second interface coupled with a second associated network;
optimization logic in communication with the first and second interfaces;
a memory configured to maintain data correlating networks with peer identifiers, the memory being coupled with the optimization logic;
wherein the optimization logic sends a first advertisement on a second interface, the first advertisement containing data representative of a network coupled with the first interface;
wherein the optimization logic receives on the first interface from a destination device having an address associated with the first associated network, a response packet for establishing a session with the destination device, wherein the source address of the packet is the address of the destination device;
wherein the optimization logic is configured to forward the response packet unchanged onto the second interface;
wherein the optimization logic is further configured to query a routing table stored in the memory for locating an entry in the routing table that matches the source address of the response packet responsive to receiving the response packet for establishing a session; and
wherein the optimization logic is configured to send a subsequent advertisement on the second interface, the routing table entry located corresponding to the source address of the response packet responsive to receiving the response packet for establishing a session and locating the entry in the routing table.

2. The apparatus set forth in claim 1, wherein the memory is configured to store a peer routing table.

3. The apparatus set forth in claim 1, wherein the memory is configured to store a routing table entry including data identifying a tunnel to a peer for a network associated with the source address of the response packet.

4. The apparatus set forth in claim 3, wherein the memory is configured to store the data identifying the tunnel as data identifying a Session Control Transport Protocol (SCTP) tunnel.

5. The apparatus set forth in claim 1, wherein the optimization logic is configured to forward a synchronization acknowledgement (SYN-ACK) packet.

6. The apparatus set forth in claim 1, wherein the second network interface is adapted to be coupled with a Wide Area Network (WAN).

7. The apparatus set forth in claim 6, wherein the optimization logic is further configured to advertise the routing table entry by sending a multicast packet onto the second network.

8. The apparatus set forth in claim 6, wherein the optimization logic advertises on the first interface a list of entries corresponding to directly connected networks associated with the second interface.

9. The apparatus set forth in claim 6, wherein the response packet establishes a tunnel between the network associated with the second interface and a device associated with the first network associated with the first interface.

10. A method, comprising:
  sending on a second interface a first advertisement with data representative of a network coupled with the first interface responsive to creating a tunnel on the second interface;
  receiving from a destination device having an address via a first interface a packet sent in response to a request to establish a session, the response packet having a source address for establishing a session with the destination device coupled with the network, wherein the source address of the response packet is the address of the destination device;
  forwarding the response packet onto the second interface unchanged;
  querying a routing table for locating an entry in the routing table that matches the source address of the response packet corresponding to the source address of the destination device disposed on the network coupled with the first interface responsive to receiving the response packet for establishing a session; and
  sending a subsequent advertisement, on the second interface, the subsequent advertisement comprising data representative of the routing table entry for the network coupled with the first interface corresponding to the source address of the response packet, responsive to receiving the packet in response to a request for establishing a session and locating the entry in the routing table.

11. The method of claim 10, wherein the routing table is a peer routing table.

12. The method of claim 10, further comprising storing in the routing table an entry that comprises data identifying a tunnel to a peer for a network associated with the source address of the response packet.

13. The method of claim 10, wherein the data identifying the tunnel comprises data identifying a Session Control Transport Protocol (SCTP) tunnel.

14. The method of claim 10, wherein the response packet is a synchronization acknowledgement (SYN-ACK) packet.

15. The method set forth in claim 10, wherein the advertisement is sent via a multicast packet on the second network.

16. The method of claim 10, further comprising advertising on the first interface a list of entries corresponding to networks that are directly connected with the second interface.

\* \* \* \* \*